UNITED STATES PATENT OFFICE.

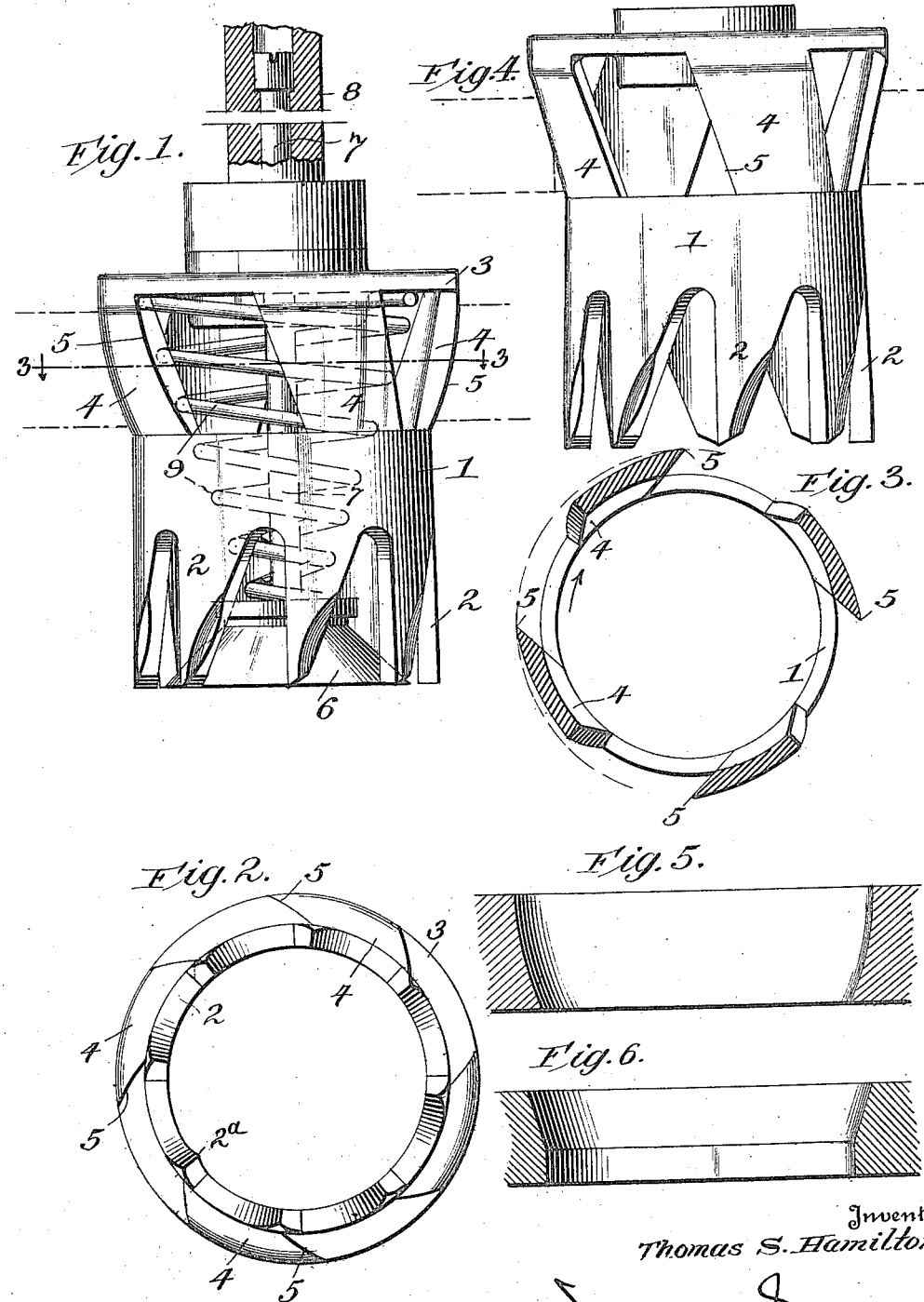

THOMAS S. HAMILTON, OF LOUISVILLE, KENTUCKY, ASSIGNOR TO MENGEL BOX COMPANY, OF LOUISVILLE, KENTUCKY, A CORPORATION OF NEW JERSEY.

WOODWORKING-TOOL.

1,234,468.  Specification of Letters Patent.  Patented July 24, 1917.

Application filed March 17, 1916. Serial No. 84,865.

*To all whom it may concern:*

Be it known that I, THOMAS S. HAMILTON, a citizen of the United States, residing at Louisville, in the county of Jefferson and State of Kentucky, have invented a certain new and useful Improvement in Woodworking-Tools, of which the following is a specification.

My present invention pertains to an improved wood-working tool for cutting openings in boards, the same being illustrated in the annexed drawings, wherein:

Figure 1 is a side elevation of a cutter constructed in accordance with my invention;

Fig. 2 a bottom plan view thereof;

Fig. 3 a transverse sectional view on the line 3—3 of Fig. 1;

Fig. 4 a side elevation of a slightly modified form of cutter; and

Figs. 5 and 6 sectional views of stock in which openings or holes have been produced by the cutters shown in Figs. 1 and 4, respectively.

The main object of the present invention is to produce a cutter of the barrel saw type, combined with a reaming section adapted to ream out the hole, to a greater or less extent, and to one or another configuration, after the hole or opening has been formed.

Referring to Figs. 1 to 3, the cutter may be said to comprise a cylindrical section 1 having a series of saw teeth, 2, formed thereon or therein, the teeth being given enough outward set to admit of clearance between the section 1 of the cutter and the wall of the opening which is formed in the board or stock. As will be seen upon reference to Fig. 2, I preferably set one of the teeth, as for instance, 2ª, inwardly to a slight extent, say, one-thirtysecond of an inch, and this has the effect of making the plug which is cut out of the stock sufficiently smaller than the interior diameter of the body of the cutter to enable the block to drop out of the cutter or to be forced out without difficulty by the ejector, hereinafter referred to.

Located between the cylindrical portion and the top or head 3 of the cutter is a series of outwardly-inclined blades or knives 4, the forward, cutting edges 5 of which stand or project outwardly beyond the body, see Fig. 3. In the present form the cutting edges are curved so that, after the teeth and body 1 have passed through the board, said knives will ream out the opening and when projected into the opening as far as is indicated by the dotted lines Fig. 1, will form an opening having a contour as shown in Fig. 5. The cylindrical form of opening may be retained to any degree, if so desired, by limiting the descent of the cutter and consequently the extent of entrance of the knives 4 into the upper portion of the opening.

In Fig. 1 I have shown an ejector adapted to force the plug or block cut from the board from within the cutter. It may be said to comprise a dished, plate-like member 6, secured upon the lower end of a rod 7 mounted to slide in a stem 8 secured in the head 3, the plate and stem being held in their lowermost or projected position by a coiled spring 9.

In Fig. 4 a slightly modified form is illustrated wherein, instead of curving the cutting edges of the reaming cutters, they are straight yet still inclined outwardly toward the upper end. When these cutters are projected into the opening formed by the teeth 2 they will ream out said opening, as shown in Fig. 6. The ejector for the cut out plug or block is omitted from this construction.

It is manifest that the desired configuration of the reamed portion of the opening may be effected by giving the reaming cutters the requisite form.

Having thus described my invention, what I claim is:

1. In a combined barrel-cutter and reamer, the combination of a head; a series of reaming cutters located below said head and inclining inwardly toward the axis of the cutter as they extend downwardly; a cylindrical section connecting the lower ends of said cutters; and a plurality of saw teeth formed in the lower edge of said cylindrical section.

2. A combined barrel-cutter and reamer formed as an integral structure and being hollow, comprising a head; a series of reaming cutters located below said head and inclining inwardly toward the axis of the cutter as they extend downwardly; a cylindrical section connecting the lower ends of said cutters; and a plurality of saw teeth formed in the lower edge of said cylindrical section.

In testimony whereof I have signed my name to this specification.

THOMAS S. HAMILTON.

Copies of this patent may be obtained for five cents each, by addressing the "Commissioner of Patents, Washington, D. C."